(12) United States Patent
Czysz (10) Patent No.: US 6,979,011 B2
(45) Date of Patent: Dec. 27, 2005

(54) MOTORCYCLE FORK BOTTOM HAVING DIFFERENT LONGITUDINAL STIFFNESS AND ADJUSTABLE LATERAL STIFFNESS

(75) Inventor: Michael Czysz, Portland, OR (US)

(73) Assignee: MotoCzysz, Portland, OR (US)

( * ) Notice: Subject to any disclaimer, the term of this patent is extended or adjusted under 35 U.S.C. 154(b) by 0 days.

(21) Appl. No.: 10/634,041

(22) Filed: Jul. 31, 2003

(65) Prior Publication Data

US 2005/0023795 A1   Feb. 3, 2005

(51) Int. Cl.[7] .................................. B62K 25/08
(52) U.S. Cl. .................... 280/276; 280/279; 188/319.1
(58) Field of Search ................ 280/275, 276, 280/279, 283, 219, 220; 74/500.5–501.6; 188/266.5–266.7, 188/316, 317, 319.1

(56) References Cited

U.S. PATENT DOCUMENTS

| 4,275,900 | A | * | 6/1981 | Andreoli et al. | ............ 280/283 |
| 4,735,276 | A | * | 4/1988 | Burton | ........................ 180/219 |
| 5,456,480 | A | * | 10/1995 | Turner et al. | ............... 280/276 |
| 5,478,099 | A | * | 12/1995 | Kawahara | .................... 280/276 |
| 5,848,675 | A | * | 12/1998 | Gonzalez | .................. 188/319.2 |
| 5,996,745 | A | * | 12/1999 | Jones et al. | .............. 188/266.7 |
| 6,017,047 | A | * | 1/2000 | Hoose | ......................... 280/276 |
| 6,026,939 | A | * | 2/2000 | Girvin et al. | ............. 188/266.7 |
| 6,382,370 | B1 | * | 5/2002 | Girvin | ...................... 188/299.1 |
| 6,669,218 | B1 | * | 12/2003 | Sinyard et al. | ............. 280/274 |

* cited by examiner

Primary Examiner—Anne Marie Boehler
Assistant Examiner—L. Lum
(74) Attorney, Agent, or Firm—Richard Calderwood (57) ABSTRACT

A motorcycle or bicycle suspension having adjustable side-to-side flexibility. The suspension includes a telescopic fork and a fork bottom which couples the fork to the axle of a wheel. The fork bottom and the fork are stiff in the direction of travel, to avoid flexing under heavy braking. The fork bottom is flexible in the lateral direction, to improve the ability of the tire to stay in contact with the ground when leaned over and cornering over irregular, bumpy ground. The lateral flexibility of the fork bottom is adjustable by tightening or loosening a tension cable which is attached to the ends of the fork bottom and stretched over a fulcrum in the middle of the fork bottom. Tightening the tension cable increases sideways thrust of the fulcrum against the fork bottom, reducing the lateral flexibility of the fork bottom.

21 Claims, 7 Drawing Sheets

MOTORCYCLE FORK BOTTOM HAVING DIFFERENT LONGITUDINAL STIFFNESS AND ADJUSTABLE LATERAL STIFFNESS

BACKGROUND OF THE INVENTION

1. Technical Field of the Invention

This invention relates generally to suspension components for two-wheeled vehicles, and more specifically to front fork components.

2. Background Art

The vast majority of motorcycles are equipped with a sliding-tube or telescopic front suspension, consisting of a pair of forks coupled to the front axle and to the steering head of the motorcycle's frame. The forks are either of the "right-side-up" or sliding-female configuration, or the "upside-down" or sliding-male configuration. In either case, a cylindrical tube or piston slides axially within a generally cylindrical cylinder. As a motorcycle rider applies the front brake, the front forks are subjected to significant flexing force and torque in the direction of travel, as the rearward force on the front tire's contact patch presses rearward on the bottom of the forks at the axle, while the inertia of the motorcycle's mass presses forward on the top of the forks at the triple-clamps. Manufacturers battle this flex by using larger-diameter and thus stiffer fork tubes.

Fork flex, especially under braking, is a significant contributor to the stiction which is known to dramatically reduce the effectiveness and perceived quality of a motorcycle's front suspension. The manufacturer may battle this stiction by making even greater increases in the diameter and stiffness of the fork tubes.

These engineering changes have an unfortunate side effect, which is exposed by the fact that motorcycles lean to the inside when cornering. In general, the faster a corner is taken, the farther over the motorcycle must lean. While leaned over, the axis of the fork suspension is not perpendicular to the ground, and yet the front tire's contact patch (which is at the center of the tire when riding straight, but is significantly off to the side of the tire when the bike is leaned over) remains parallel to the ground. Then, when the front tire encounters a bump in the road, the bump forces the tire in the vertical direction, perpendicular to the ground. But, because the forks are not oriented in that direction, the effect is that the force of the bump is applied to the forks somewhat laterally (in other words, radially or sideways), rather than axially with respect to the sliding ability of the fork tubes.

The forks' stiffness, which the engineer gave the fork tubes to counteract flex under braking, is now doing exactly the wrong thing with respect to the force of the bump—it is fighting the bump, rather than supplely allowing the front tire to track the road surface and remain in contact with the ground. Riders experience this as one form of front end chatter, especially when traversing an extended section of bumpy or rippled racetrack corner. The result is often a front end push which may end in a crash.

What is needed, then is an improved front fork which has suitably low lateral stiffness to better enable the front tire to track ground irregularities while leaned over cornering, without compromising its excellent longitudinal stiffness to resist flexing under hard braking. What is further desirable is such a fork which has adjustable lateral stiffness.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 1:
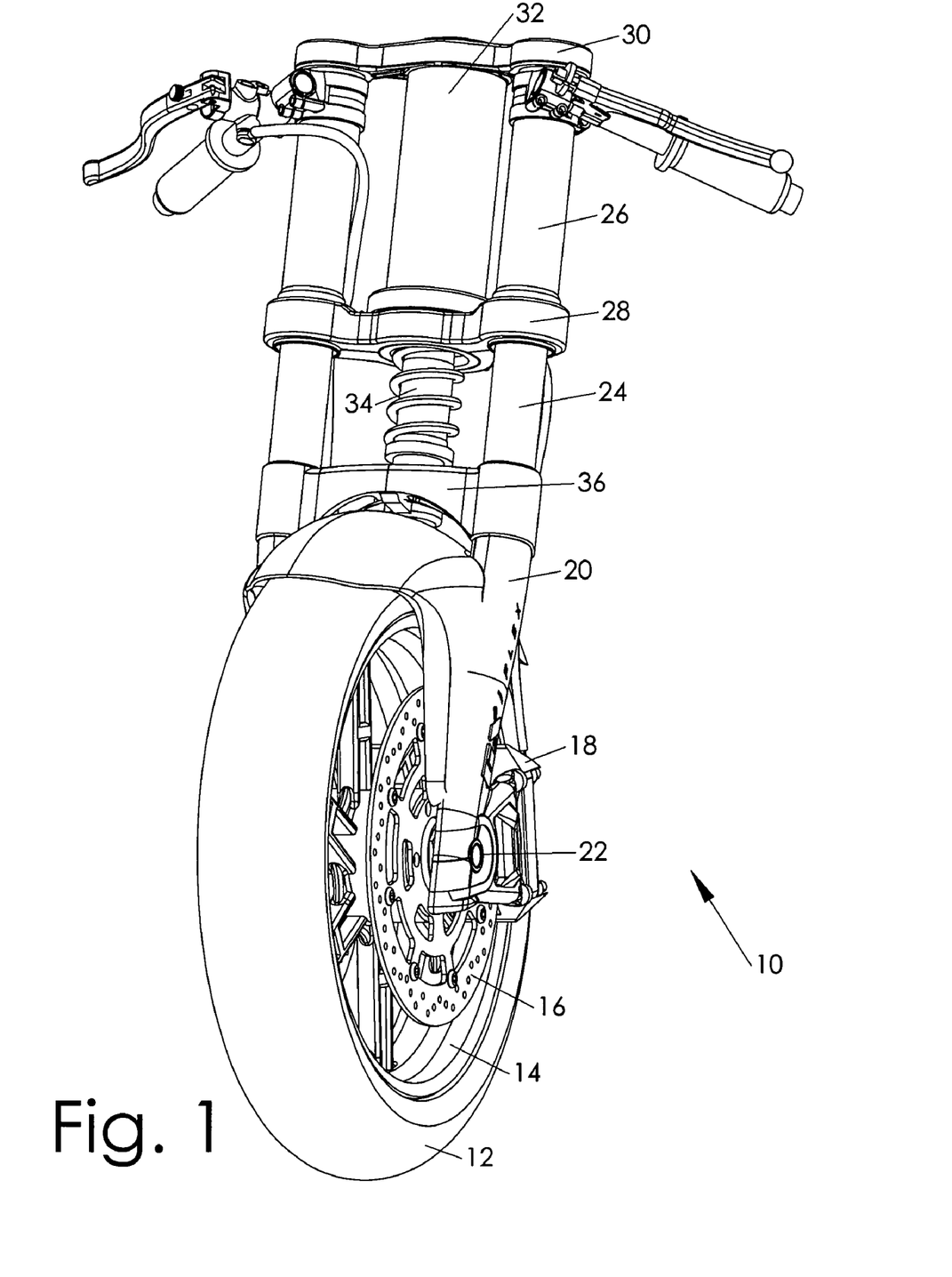
FIG. 1 shows a motorcycle front end equipped with one embodiment of a fork according to this invention.

FIG. 1 illustrates one embodiment of a motorcycle front end 10, viewed generally from the front. The front end includes a tire 12 mounted on a wheel 14 and equipped with brake rotors 16 and brake calipers 18. A fork bottom 20 includes a fork bottom body coupled to the axle 22 and to a pair of male lower fork tubes 24 which slide in a pair of female upper fork tubes 26. The longitudinal (in the direction of travel) stiffness of the fork bottom is different than the lateral (side-to-side) stiffness of the fork bottom. In one embodiment, the longitudinal stiffness is greater than the lateral stiffness. In some embodiments, the lateral stiffness of the fork bottom is adjustable, as explained below.

A lower triple clamp 28 and an upper triple clamp 30 are coupled to the upper fork tubes and couple them to a steering stem assembly (not visible) which rotates within a steering tube 32 which is part of, or coupled to, the frame (not shown) of the motorcycle.

The front end 10 thus pivots or rotates about a steering axis which is coaxial with the steering tube 32. This invention differs from the prior art in that at least one of the spring (suspension) and/or shock (damping) components is coaxially disposed within the steering tube. In one embodiment, a monoshock 34 provides both spring support and damping for the front end, while in other embodiments, a more conventional cartridge system (not shown) could be employed within the fork tubes. The bottom end of the monoshock is coupled to a fork buttress 36. The fork buttress may be coupled to the lower fork tubes or to the fork bottoms. In one embodiment, the fork buttress comprises two halves, each of which is integrally formed with a respective fork bottom, as shown.

Figure 2:
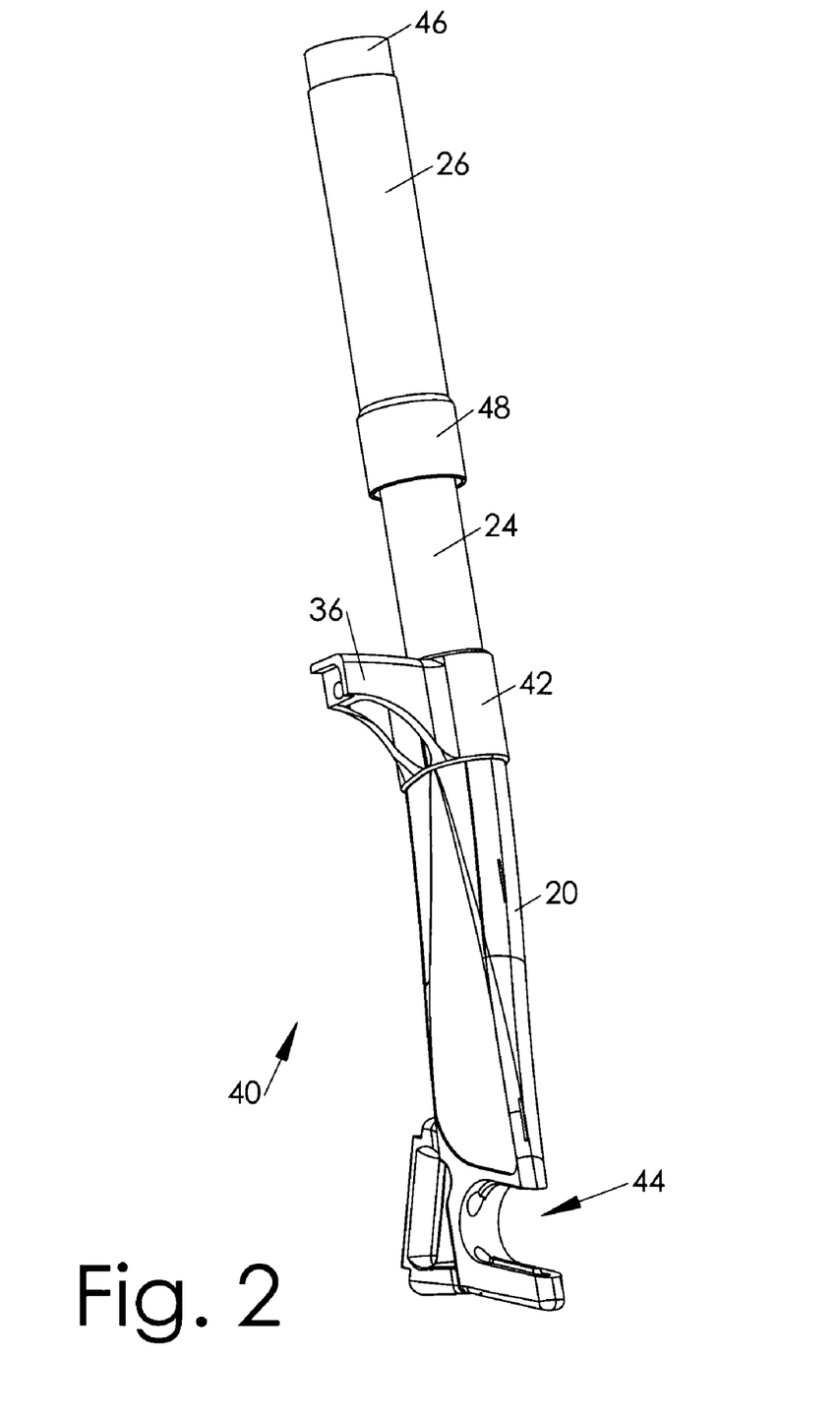
FIG. 2 shows one embodiment of a fork according to this invention.

FIG. 2 illustrates one embodiment of a fork 40 according to this invention. The fork includes an upper fork tube 26, a lower fork tube 24, and a fork bottom 20. The fork bottom includes a sturdy upper end 42 adapted for receiving and retaining the lower fork tube by any suitable means such as pinch bolts (not shown), threads (not shown), or the like. In one embodiment, the fork's half buttress 36 is integrally formed with the sturdy upper end of the fork bottom. The fork bottom further includes a lower end 44 adapted for receiving and retaining the axle assembly (not shown) and the brake caliper (not shown) by any suitable means. The upper fork tube includes an upper end 46 adapted for being secured to the upper triple clamp (not shown) by any suitable means, such as threads (not shown) or pinch bolts (not shown). The upper fork tube includes a lower end 48 adapted for providing a good sliding fit with the lower fork tube.

In some embodiments, especially those in which both the spring and shock components are located coaxially within the steering tube, the forks can be much simplified versus the prior art. For example, the telescoping fork tubes do not need to be made to have a fluid-tight seal, as there is no need for them to retain the oil which would be used in a damping system. In fact, in some embodiments, it will be found desirable to ventilate the upper fork tube, the lower fork tube, and/or the fork bottom, to eliminate any pressurization caused by the pumping action of the forks as they extend and compress.

Figures 3, 3A:
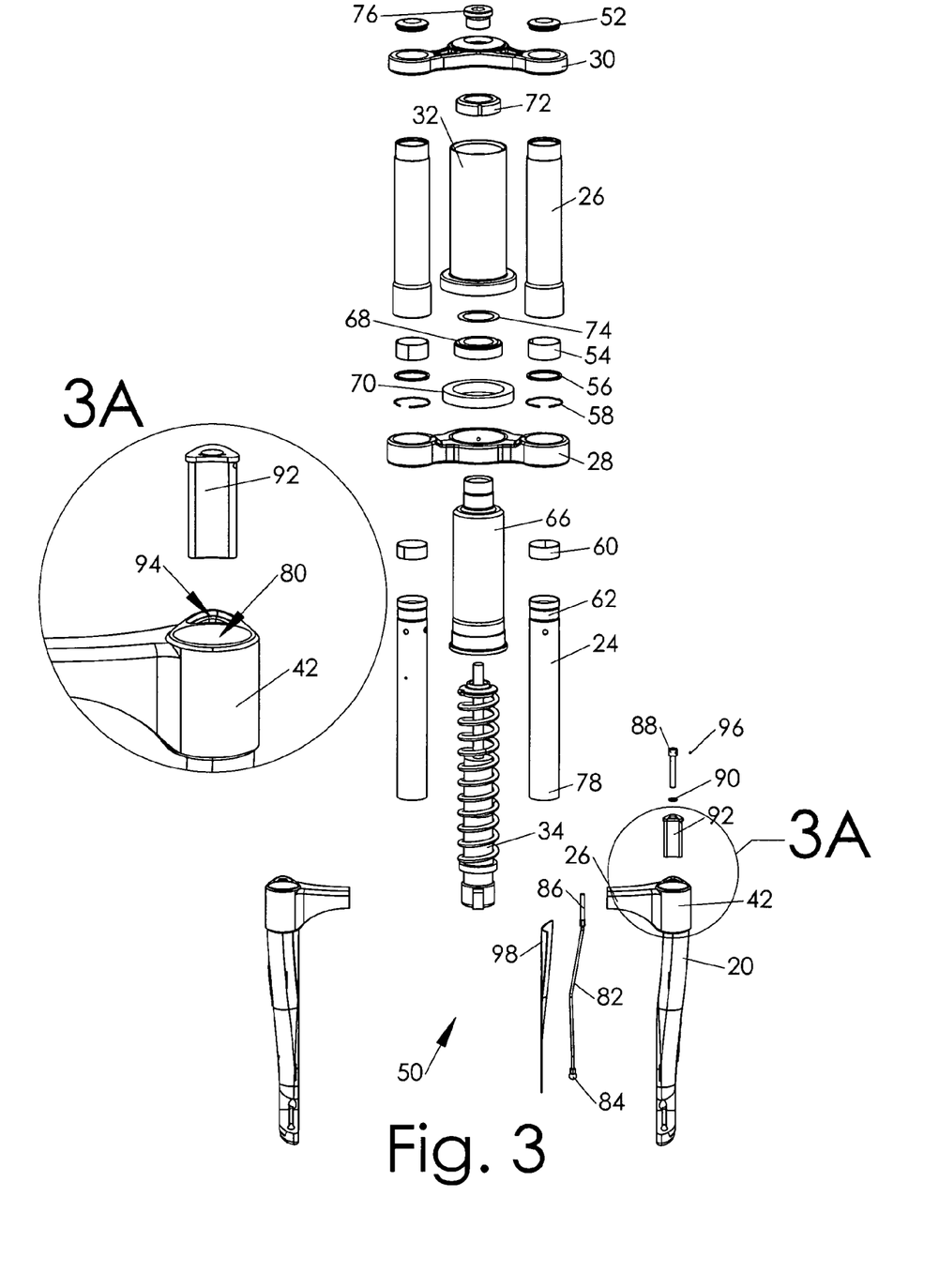
FIG. 3 shows an exploded view of the components of one embodiment of a motorcycle front end according to this invention.

FIG. 3 illustrates the suspension components 50 of the motorcycle front end, viewed generally from the front and shown in an exploded view. For ease of illustration, only a single fork will be described. The upper fork tube 26 threads into the upper triple clamp 30. A fork cap 52 seals the open end of the fork tube to prevent gross contamination of the sliding components, but is not necessarily an airtight seal. A stationary fork bushing 54 and a seal 56 fit within the lower end 48 of the upper fork tube, and are held in place by a snap wire 58. A sliding fork bushing 60 mates with the upper end 62 of the lower fork tube. The stationary and sliding fork bushings provide a low-stiction but tight-tolerance sliding fit of the lower fork tube within the upper fork tube. In practice, the components may need to be assembled in a slightly different manner than suggested by this exploded view, as the bushings are not generally able to slide past each other, and their interference is part of what keeps the telescopic forks from telescoping completely to disassembly.

A shock tube 66 rotates within the steering tube 32 on an upper bearing 68 and a lower bearing 70. A jam nut 72 and washer 74 secure the upper bearing onto the shock tube. A top bolt 76 threads into the shock tube and secures it to the upper triple clamp.

The lower end 78 of the lower fork tube threads or otherwise couples to a hole 80 in the upper end 42 of the fork bottom 20. The upper end of the monoshock 34 fits up into and engages the shock tube, while the lower end of the monoshock engages the fork buttress 36 at the upper end 42 of the fork bottom.

The lateral stiffness of the fork bottom is controlled by a tension cable 82. The lower end 84 of the tension cable engages the fork bottom, while the upper end 86 of the tension cable is engaged and tensioned by a tension adjuster 88. The tension adjuster and a washer 90 engage a tension adjuster block 92 which fits into a hole 94 in the upper end of the fork bottom. A detent ball 96 retains the tension adjuster within the tension adjuster block and, in some embodiments, provides "clicker" adjustment feedback as is commonly present in other motorcycle suspension adjustments such as compression and rebound damping. For aesthetics and aerodynamics, a fork bottom inner cover 98 may be coupled to the inward portion of the fork bottom, covering the tension cable and other components. In some embodiments, the tension cable may be a tension rod. In some embodiments, the tension rod may apply tension or pull, while in other embodiments it may provide extension or push.

Figure 4:
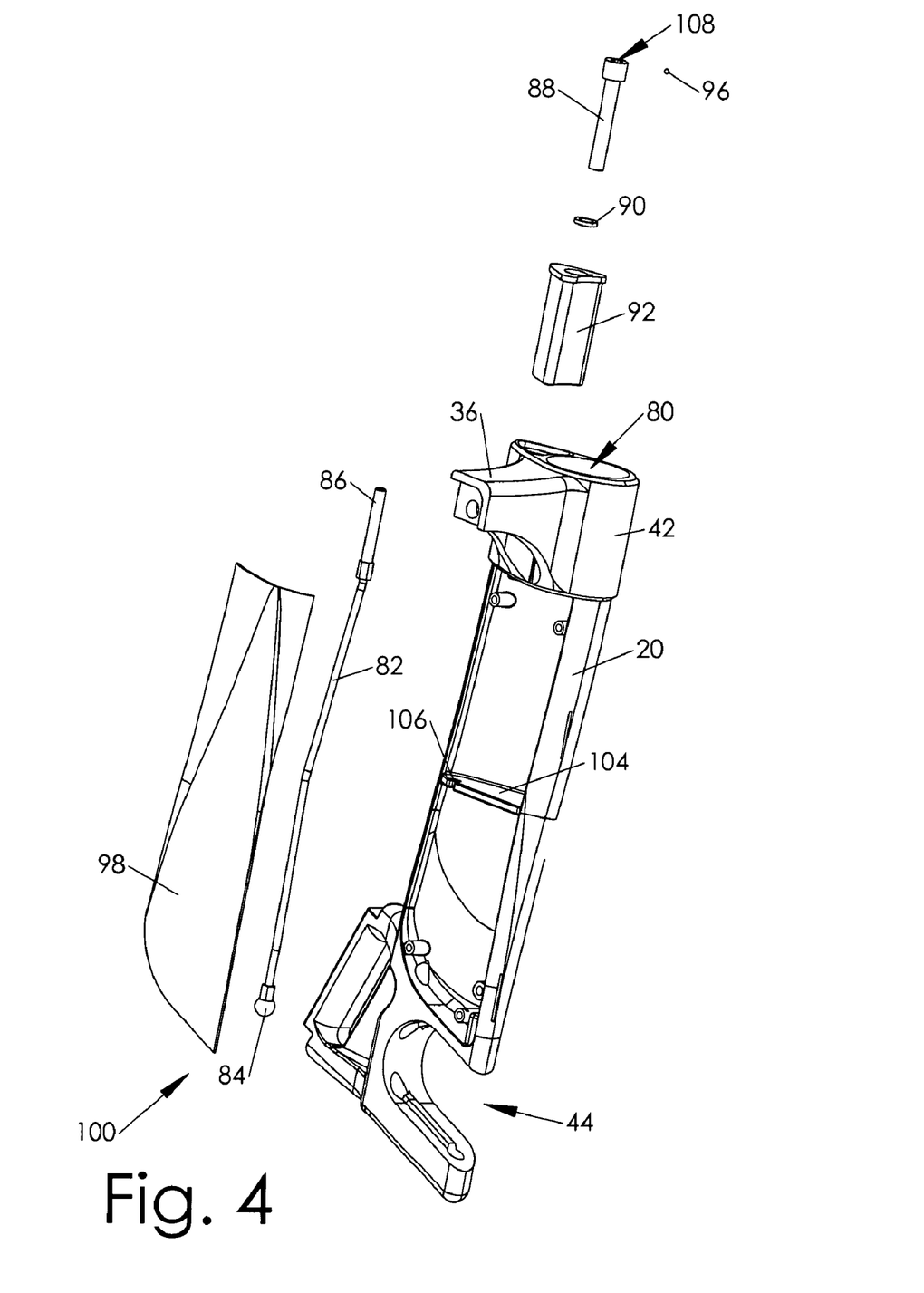
FIG. 4 shows a more detailed exploded view of some of the components of one embodiment of a fork bottom according to this invention.

FIG. 4 illustrates further details of one embodiment of the adjustable flex fork bottom assembly 100. The left fork bottom 20 is shown, as viewed from the front and right, or generally where the front of the tire would be. The side wall 102 of the fork bottom provides stiffness in the longitudinal direction, the direction of travel and braking, while the fact that the fork bottom is not a complete cylinder gives it a measure of lateral flex, from side to side.

A gusset 104 near the middle of the fork bottom provides a fulcrum over which the tension cable 82 is stretched, and may be provided with one or more grooves 106 or bearings or other means for holding the tension cable in a desired position. The lower end 84 of the tension cable is provided with a ball or other means for coupling to the lower end of the fork bottom. The upper end of the tension cable is provided with a threaded rod 86 which engages threads on the tension adjuster 88. The tension adjuster may be provided with a hexagonal socket 108 by which a mechanic can set the flex by tightening or loosening the tension cable, and thus the lateral pressure on the fulcrum 104, thereby changing the amount of lateral flex of the fork bottom. In other embodiments, other adjustment mechanisms may be employed, such as a cammed lever.

As the tension on the tension cable is increased, the fork bottom is placed under increased lateral tension as the tension cable presses down harder and harder on the fulcrum. This tends to make the fork bottom less flexible in the side-to-side dimension, while having little effect on its stiffness in the longitudinal direction. Thus, the invention enables the rider to set up his front suspension to be more or less compliant in lateral flex, to tune the suspension for the mid-corner bumpiness or smoothness of a particular road or racetrack, without compromising longitudinal stiffness which provides good control under heavy braking and which helps eliminate stiction in the telescopic fork tubes. In some cases, the rider may even choose to adjust one fork's sideways flex differently than the other's.

The skilled suspension engineer will be able to select materials, thicknesses, and geometries to provide the desired longitudinal and lateral stiffnesses for his application at hand. For example, in one embodiment, the entire fork bottom is constructed as a monolithic metal structure, such as of cast aluminum. In another embodiment, the central portion of the fork bottom may be fashioned of carbon fiber, while the upper and lower ends may be fashioned of titanium.

Figure 5:
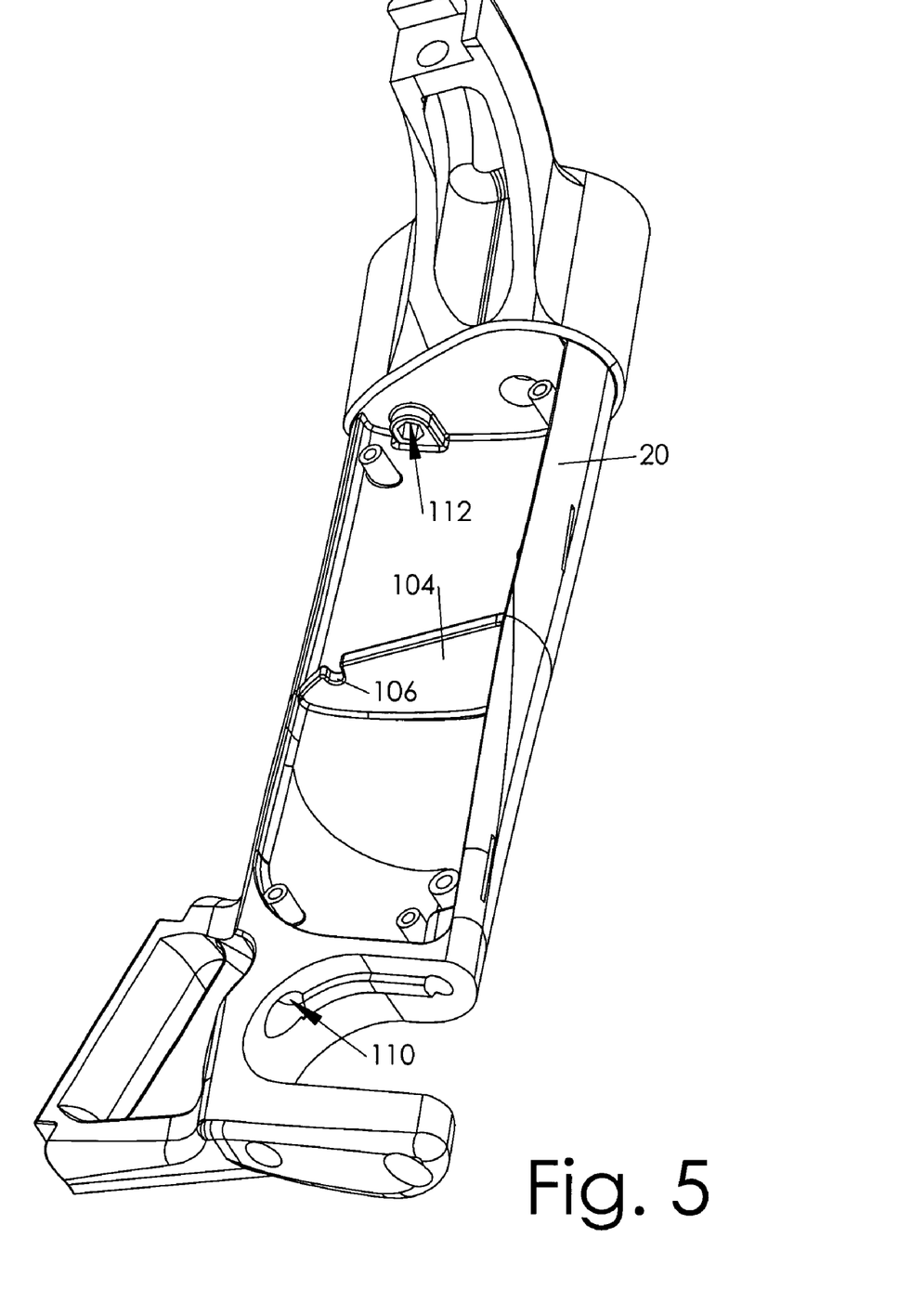
FIG. 5 shows a different angle view of the fork bottom, particularly pointing out the attachment points for the flex control mechanism.

FIG. 5 illustrates the left fork bottom 20 in further detail, viewed from the front and below, to better demonstrate the mounting of the tension cable (not shown). The upper end of the tension cable is fed through a hole 110 in the lower end of the fork bottom and pulled through until the ball engages the hole 110. The cable is routed through the groove 106 on the fulcrum 104 and through a hole 112 in the upper end of the fork bottom, then the tension adjuster (not shown) is engaged with the tension cable to place it under tension and retain it.

In other embodiments, alternative mechanisms could be used instead of the tension cable. For example, a pair of threaded rods could each engage the fulcrum and a respective end of the fork bottom, and the rods could be used to place the fork bottom under tension or even under elongating pressure, and the rods could operate independently in some modes. Or, the tension adjustment could be made at the fulcrum, rather than at the end of the tension cable, such as via a jack screw. In another embodiment, the adjustable tension cable could be replaced by a set of alternative vertical inserts placed inside the fork bottom to provide various amounts of end-to-end pressure or tension. Such inserts would advantageously be placed generally perpendicular to the side wall and fulcrum shown in these drawings.

Figure 6:
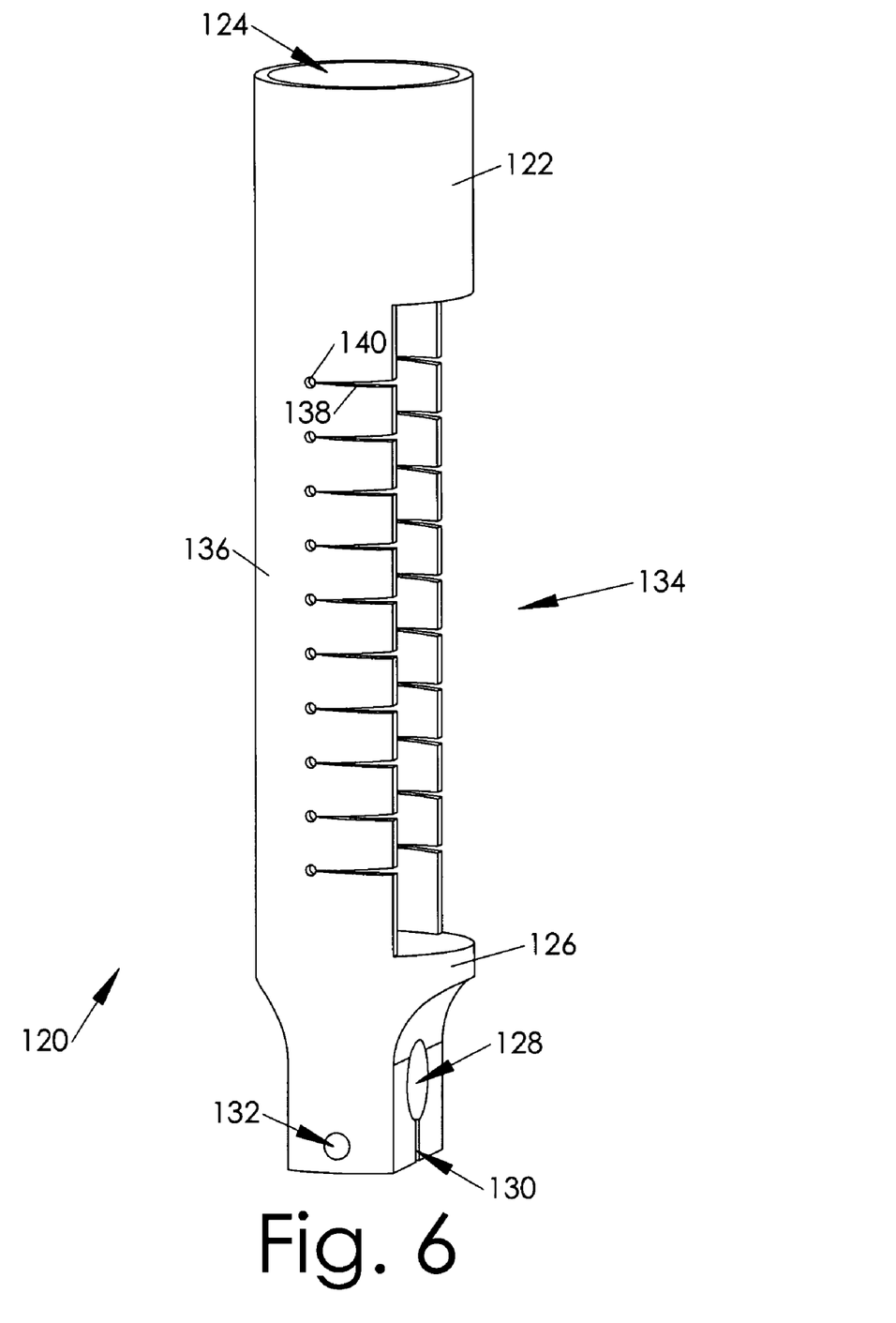
FIG. 6 shows another embodiment of a fork bottom which has different lateral and longitudinal stiffness.

FIG. 6 illustrates another embodiment of a fork bottom 120 which has a different stiffness in the longitudinal direction than in the lateral direction. Shown is a right fork bottom, seen from the front and left. The fork bottom includes an upper end 122 adapted with a hole 124 for receiving the lower fork tube (not shown), and a lower end 126 adapted with a hole 128 for receiving the axle (not shown). A slot 130 and a pinch bolt hole 132 are provided for retaining the axle by a pinch bolt (not shown). The middle portion 134 of the fork bottom includes a side wall 136 which provides good longitudinal stiffness. A series of slits 138 soften the central portion of the fork bottom, giving it more flexibility in the lateral direction. The slits may be provided with holes 140 at their terminal ends, to prevent the slits from tearing or spreading further through the material of the fork bottom. As the fork bottom flexes toward the side such that the slits compress, at the point at which the sides of the slits meet, the fork bottom will become more rigid. In some embodiments, the slits may be made of different dimensions (e.g. vertical height in the orientation shown), such that they do not all pinch closed at the same amount of lateral flex, for a more "progressive" and less abrupt increase in the lateral stiffness of the fork bottom.

Figure 7:
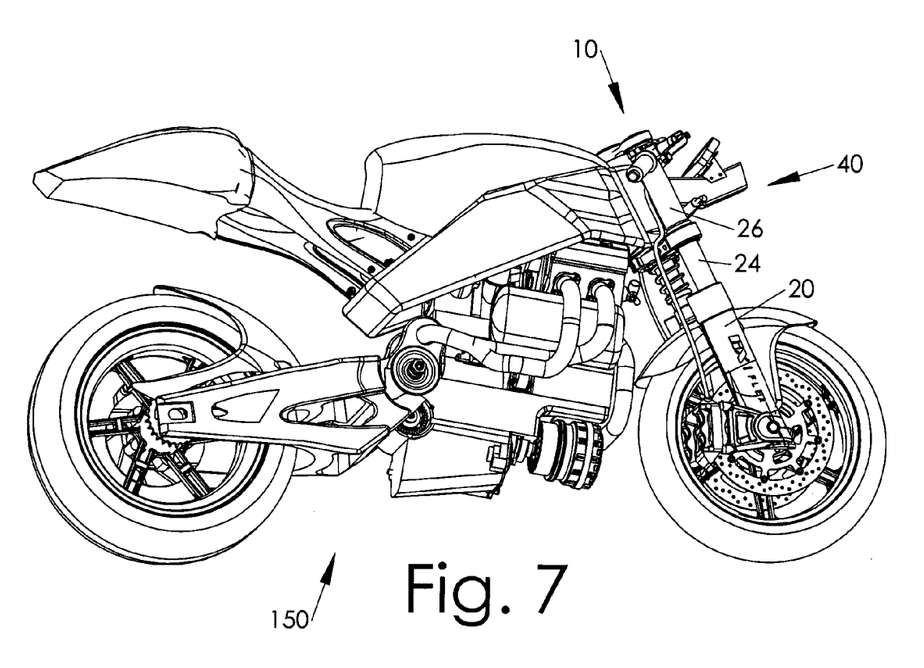
FIG. 7 shows a motorcycle equipped with one embodiment of a flexible fork bottom of this invention.

FIG. 7 illustrates a motorcycle 150 adapted with the front end 10 having the forks 40 of the present invention, including upper fork tubes 26 and lower fork tubes 24, and including fork bottoms 20 having different longitudinal stiffness and lateral stiffness, and having adjustable lateral stiffness.

CONCLUSION

While the invention has been described with reference to its use in a motorcycle, the invention is not limited to motorcycles, but can be used in bicycles, automobiles, and other vehicles. And while the invention has been shown as using an "upside-down" fork, it may alternatively be used with a "right-side-up" fork. Some components have been illustrated as being of monolithic construction, while other components have been illustrated as being separate components coupled together. The skilled reader will readily appreciate that the designer may elect, within the scope of this invention, to split some components into separate subcomponents, or to combine various components into a monolithic whole. For example, the lower fork tube and the fork bottom could be formed as one integral component. The fork bottom has been shown having a length such that it extends above the top of the front tire, but the invention is not thus limited; rather, any suitable length fork bottom may be used, so long as it has meaningfully different stiffness in the longitudinal and lateral directions (in contrast to the small mounting structures, typically machined from billet, which are found on the bottom of conventional upside-down forks).

The reader will further appreciate that the invention may be practiced in a suspension having only a single fork, and that the "triple clamps" will not in that case have means for coupling a third tube, but only the steering tube and the upper fork tube. The reader will further appreciate that, in some applications, it may actually be desirable to make the lateral stiffness higher than the longitudinal stiffness. The reader will further appreciate that the tension cable may be used to adjust the longitudinal stiffness, rather than the lateral stiffness.

When one component is said to be "adjacent" another component, it should not be interpreted to mean that there is absolutely nothing between the two components, only that they are in the order indicated. The various features illustrated in the figures may be combined in many ways, and should not be interpreted as though limited to the specific embodiments in which they were explained and shown. Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A suspension for use with a vehicle which travels in a longitudinal direction, the suspension comprising:
   a lower fork tube;
   an upper fork tube slidably coupled to the lower fork tube, wherein one of the fork tubes is disposed partially within the other; and
   a fork bottom having a substantially semi-cylindrical fork bottom body rigidly coupled to the lower fork tube and having different stiffness in the longitudinal direction than in a lateral direction generally perpendicular to the longitudinal direction;
   wherein the longitudinal stiffness is greater than the lateral stiffness; and
   wherein the fork bottom further comprises means for adjusting a lateral stiffness of the fork bottom body.

2. The suspension of claim 1 wherein the means for adjusting comprises:
   a tension cable having a lower end coupled to a lower end of the fork bottom body and an upper end coupled to an upper end of the fork bottom body; and
   the fork bottom body including a fulcrum over which the tension cable is stretched.

3. The suspension of claim 2 wherein the means for adjusting further comprises:
   a threaded adjuster coupled to the tension cable for adjusting tension on the tension cable.

4. The suspension of claim 1 wherein the means for adjusting comprises:
   a tension rod having a lower end coupled to a lower end of the fork bottom body and an upper end coupled to an upper end of the fork bottom body, whereby at least one of tension and pressure may be applied to the fork bottom by the tension rod.

5. The suspension of claim 1 further comprising:
   a fulcrum coupled to the fork bottom; and
   a tension cable coupled to the fork bottom and placed under tension against the fulcrum to impart lateral pressure against the fork bottom.

6. The suspension of claim 1 wherein:
   the lower fork tube is disposed within the upper fork tube.

7. The suspension of claim 1 wherein the vehicle comprises:
   a two-wheeled vehicle.

8. The suspension of claim 7 wherein the two-wheeled vehicle comprises:
   a motorcycle.

9. A two-wheeled vehicle comprising:
   a frame including a steering tube;
   an upper triple clamp rotatably coupled to the steering tube;
   a lower triple clamp rotatably coupled to the steering tube;
   a pair of sliding tube forks coupled to the triple clamps;
   a wheel assembly including a wheel coupled to an axle; and a pair of fork bottoms non-telescopingly coupling the forks to the axle, wherein the fork bottoms have different stiffness in a longitudinal direction of travel of the two-wheeled vehicle than in a lateral direction substantially parallel to the axle;

wherein the stiffness in the longitudinal direction is greater than the stiffness in the lateral direction;

wherein at least one of the fork bottoms comprises,
   a fulcrum, and
   a tension cable stretched over the fulcrum, placing the fork bottom under end-to-end tension such that the fulcrum provides side-to-side pressure on the fork bottom to increase sideways stiffness of the fork bottom.

10. The two-wheeled vehicle of claim 9 wherein the at least one of the fork bottoms further comprises:
an adjuster for changing tension on the tension cable to adjust the sideways stiffness of the fork bottom.

11. The two-wheeled vehicle of claim 10 wherein:
both of the fork bottoms comprise a fulcrum, tension cable, and adjuster.

12. The two-wheeled vehicle of claim 11 wherein the two-wheeled vehicle comprises:
a motorcycle.

13. The two-wheeled vehicle of claim 9 wherein:
upper ends of the fork bottoms extend upward beyond an uppermost point of the outer diameter of the wheel.

14. The two-wheeled vehicle of claim 9 wherein:
the fork bottoms are longer than inner sliding tubes of the forks.

15. A method of adjusting side-to-side flex of a two-wheeled vehicle suspension, the suspension including a sliding tube fork coupled to a fork bottom, the method comprising:
adjusting end-to-end tension on a tension cable which is coupled to both ends of the fork bottom and stretched over a fulcrum between the ends of the fork bottom;
whereby side-to-side pressure exerted by the tension cable on the fulcrum, and by the fulcrum on the fork bottom, is adjusted.

16. The method of claim 15 wherein adjusting the tension on the tension cable is accomplished by:
turning a threaded tension adjuster which couples one end of the tension cable to the fork bottom.

17. A fork bottom comprising:
a body having different longitudinal stiffness than lateral stiffness;
means at an upper end of the body for coupling to a fork tube;
means at a lower end of the body for coupling to an axle;
a tension cable;
means at the upper end of the body for coupling to an upper end of the tension cable;
means at the lower end of the body for coupling to a lower end of the tension cable; and
a fulcrum substantially in a middle of the body.

18. The fork bottom of claim 17 wherein:
the longitudinal stiffness is greater than the lateral stiffness.

19. The fork bottom of claim 17 wherein the fulcrum comprises:
means for positioning the tension cable.

20. The fork bottom of claim 17 further comprising:
an adjuster coupled to the upper end of the tension cable and to the upper end of the body, for adjusting tension on the tension cable.

21. The fork bottom of claim 17 further comprising:
a lower fork tube integrally formed with the body.

* * * * *